June 7, 1949.  H. B. MARDER  2,472,114
VISUAL TRAINING DEVICE
Filed Feb. 8, 1946  2 Sheets-Sheet 2
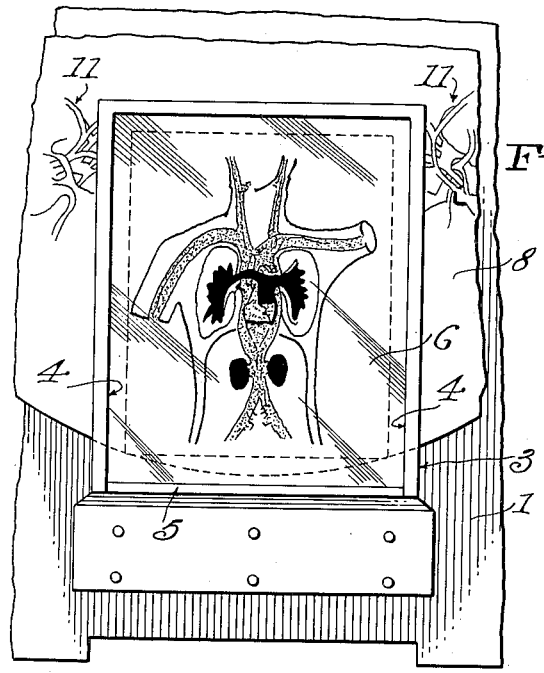
Fig.2.
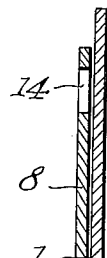
Fig.3.
Fig.4.
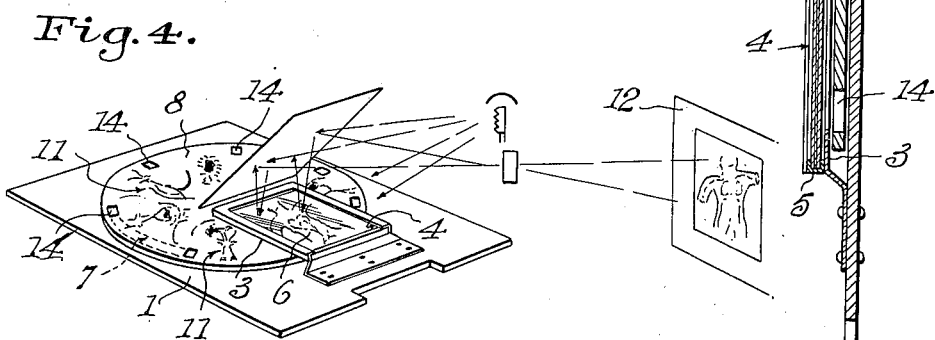
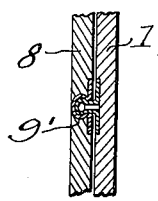
Fig.5.
Inventor
Herbert B. Marder
By
Attorneys Patented June 7, 1949

2,472,114

UNITED STATES PATENT OFFICE 2,472,114

VISUAL TRAINING DEVICE

Herbert B. Marder, Chicago, Ill.

Application February 8, 1946, Serial No. 646,478

1 Claim. (Cl. 35—74)

(Granted under the act of March 3, 1883, as amended April 30, 1928; 370 O. G. 757)

The invention described herein may be manufactured and used by or for the Government for governmental purposes, without payment to me of any royalty thereon.

This invention relates to visual training devices, and it is particularly directed to a visual training projection device having a format and series of progressive indicia arranged for successive registration with the format.

It is an object of this invention to provide an efficient device for progressively illustrating the relationship of component parts in a process, step of operation, machine, or other subject under study.

It is another object of this invention to provide a visual training aid device having the combined advantages of clarity, accuracy, continuity, and interest retention.

It is a further object of this invention to provide a projectable basic image associated with a rotatable member having marginated illustrations arranged to successively register with the basic image to depict data in logical sequence.

A still further object of this invention is to provide a device of the character described provided with stop means for insuring proper aligning of the marginated illustrations with the basic image in logical succession.

The foregoing and other objects and advantages of this invention will be more apparent from reading the following detailed specification in conjunction with the drawings forming a part hereof, wherein:

Figure 2 is a plan view of a fragment of the device showing the format in the format holder registering with marginated material on the disc;

Figure 3 is a detailed cross-sectional view of the device showing the spaced relationship of the frame, disc, format holder and format;

Figure 4 is a diagrammatic view showing the image projected to a screen with a "baloptican"; and Figure 5 is a detailed sectional view showing a modification of means for rotatably fastening the disc to the frame.

Figure 1:
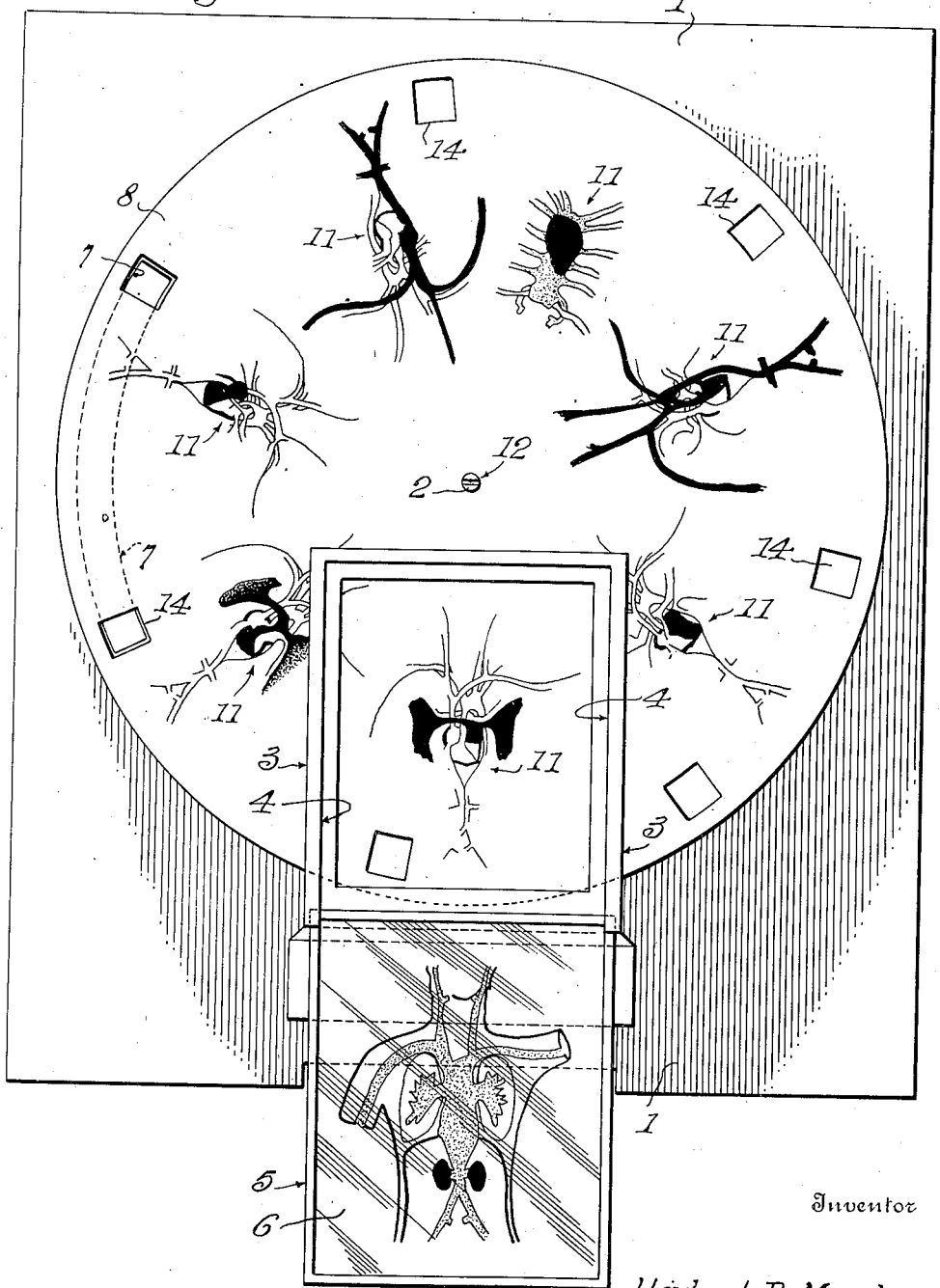
Figure 1 is a plan view of the rotatable disc mounted on the frame with the format partially positioned in the format holder.

Referring more particularly to the drawings, where like members are given the same reference numeral, a frame 1 has positioned thereon a format holder 3 provided with recesses or guides 4 adapted to receive a format frame 5 supporting the format 6. The frame 1 is provided with an arcuate aperture 7 to control or limit the degree of rotation of a disc 8 in a manner to be described more fully hereinafter.

Rotatably supported by the frame 1 and positioned between the frame 1 and format frame holder 3 is a disc 8 having radially positioned printed indicia or images 11, such as diagrams, charts, and the like thereon and preferably depicting graphic flow of information in logical sequence. The distance of the indicia 11 from the pivot point 12 connecting the frame 1 and disc 8 is such that the printed indicia 11 will align or register with the format 6 when rotated thereunder. The disc 8 is pivotally mounted to the frame 1 by a bolt 2, and held in spaced relationship with the frame by a spacer 9 positioned therebetween and on the bolt 2. An optional method of rotatably attaching the disc 8 to the frame 1 is with a snap fastener 9', as illustrated in Fig. 5.

The disc 8 is provided with a plurality of radially positioned apertures 14 arranged to register with the arcuate aperture 7 in the frame 1. The position and length of the aperture 7 and distance between the apertures 14 is such that two of the apertures 14 are registering with the aperture 7 and have the outer edge of one aperture 14 aligned with an end of the arcuate aperture 7 when one of the printed indicia 11 is properly aligned and registering with the format 6. By inserting a rod, finger, or the like in one of the apertures 14 and rotating the disc 8 until the rod or finger is stopped by the end of the arcuate aperture 7, the next successive printed indicia 11 is aligned and registering with the format 6. The format is preferably opaque with transparent parts permitting the indicia 11 on the disc 8 to be visible, thus projecting the basic image of the format 6 and the changeable image of the printed indicia 11.

For durability of construction and protective reasons, the rotatable disc 8 may be pivotally mounted between the frame 1 and a back member, in any suitable manner, such as a bolt extending through the frame, disc and back member with spacers surrounding the bolt and positioned on each side of the disc. A sight aperture is provided in the frame beneath the format holder, when this construction is used.

The construction of the device is such that one format and its corresponding rotatable disc may be easily and rapidly replaced by another format and rotatable disc thereby utilizing the device for instruction on numerous subjects.

In operation, a framed format 6 is positioned in the format frame holder 3, and a rotatable disc 8 having marginated indicia 11 arranged in logical sequence is mounted on the frame 1. The frame 1 is then positioned in any suitable opaque projector, which projects the basic image of the format 6 and a marginated indicia 11 in superimposed relationship upon a screen 12. By turning the rotatable disc 8, the details of the picture on the screen change in logical sequence, while the basic image remains unchanged.

I have prepared a series of format and corresponding discs on various subjects. To mention a few, there may be included the methods of treating fractures, chest and abdominal wounds, and war gas casualties; the operation of machine guns, rifles and grenades; and the identification of insignia, uniforms, aircraft, and battlefronts. The subject selected for illustration in the drawing, however, is related to an anatomical study of the heart and circulatory system. As illustrated the format 6 comprises a transparent sheet having an opaque image outline of a section of the human body and certain organs properly positioned thereon. The rotatable disc 8 has the progressive indicia 11 arranged to properly align with the opaque image of the format 6. These indicia start with an opaque representation of the heart and sternum with ribs attached, which indicia is arranged to align with the transparent portion of the opaque outline on the format and in proper relationship to the other organs depicted thereon. The successive indicia possess elements that the preceding ones did not possess to progressively build up pictures of the heart and circulatory system in logical sequence.

Having thus described my invention, what I claim as new and wish to secure by Letters Patent is:

In a device adapted to cooperate with a projector to allow details of a projected image to change in logical sequence with the basic image remaining unchanged, the combination comprising a frame, a format frame supported by said frame, a format supported by said format frame and provided with an unchanging permanent basic image having transparent portions therein, a member rotatably mounted on the first-mentioned frame, indicia arranged and circularly spaced in logical sequence on the rotatable member and positioned to come into vertical registration with the transparent portions of the unchanging permanent basic image or outline on the format in logical succession, and cooperating stop means including an arcuate slot in the first-mentioned frame extending the length of the arcuate spacing assigned to a selected indicium, and openings in said disc adapted for the insertion of a turning member, said openings being arranged at both sides of each indicium and spaced arcuately the length of said slot and adapted to register with the ends of said slot to limit the movement of said turning member and said disc with respect to said format for the successive alignment of selected indicia with respect to the permanent image.

HERBERT B. MARDER.

REFERENCES CITED

The following references are of record in the file of this patent:

UNITED STATES PATENTS

| Number | Name | Date |
| --- | --- | --- |
| 359,878 | Miller | Mar. 22, 1887 |
| 410,135 | Brieckner et al. | Aug. 27, 1889 |
| 598,509 | Hall | Feb. 8, 1898 |
| 799,609 | Ludwig | Sept. 12, 1905 |
| 813,836 | Smith | Feb. 27, 1906 |
| 960,519 | Dutton | June 7, 1910 |
| 1,027,448 | Stevens | May 28, 1912 |
| 1,104,067 | Murayama | July 21, 1914 |
| 1,177,652 | Robertson | Apr. 4, 1916 |
| 1,218,607 | Willens | Mar. 16, 1917 |
| 1,552,406 | Akerbladh | Sept. 8, 1925 |
| 1,639,918 | Wright | Aug. 23, 1927 |
| 2,045,990 | MacFarlane | June 30, 1936 |
| 2,047,002 | Cantwell | July 7, 1936 |

FOREIGN PATENTS

| Number | Country | Date |
| --- | --- | --- |
| 18,147 | Great Britain | Aug. 6, 1909 |
| 214,025 | Great Britain | Apr. 17, 1924 |
| 390,974 | Germany | 1924 |